Figure 1:
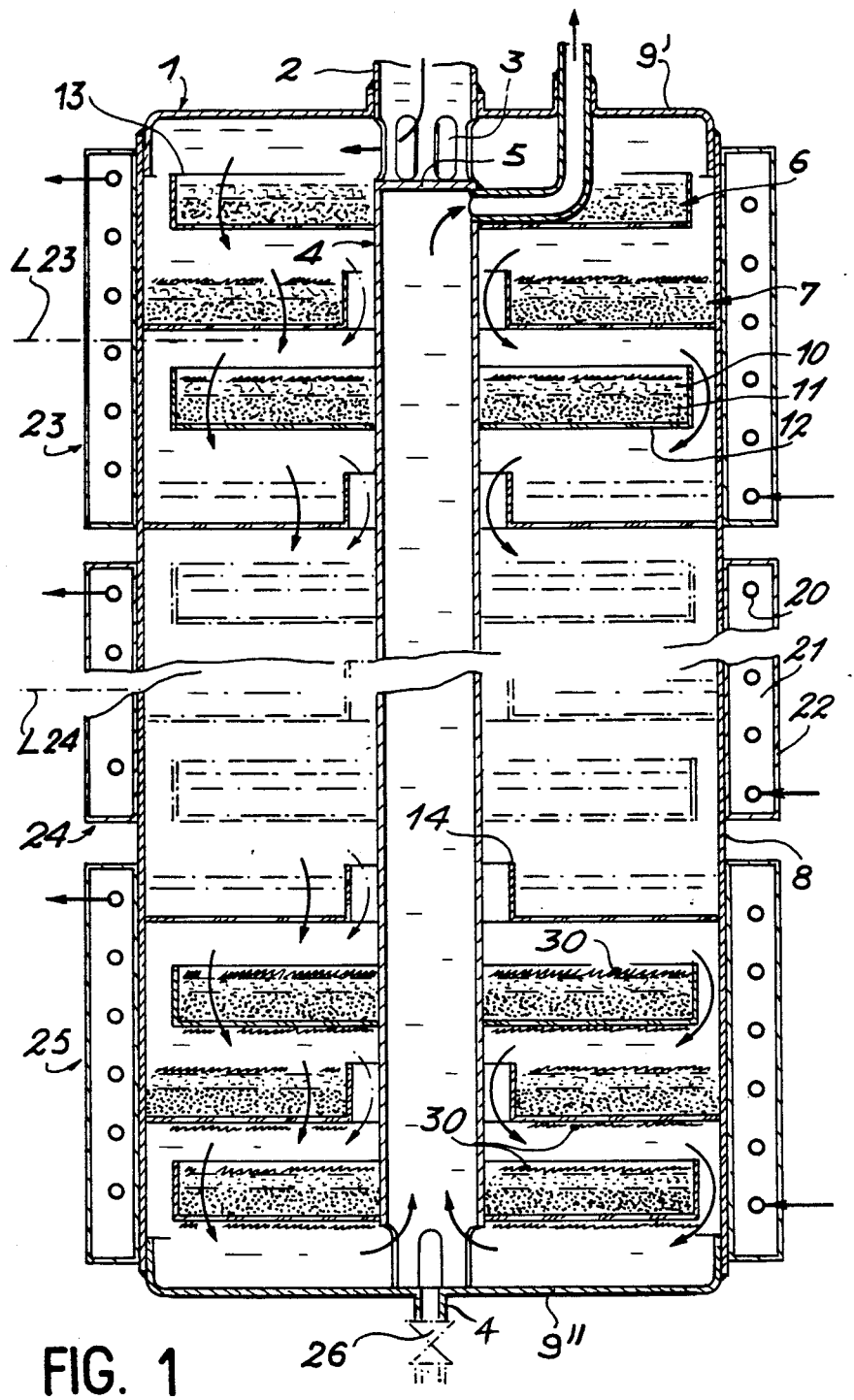

United States Patent [19]

Latge

[11] Patent Number: 4,892,653
[45] Date of Patent: Jan. 9, 1990

[54] COLD TRAP FOR THE PURIFICATION OF LIQUID METALS CONTAINING DISSOLVED IMPURITIES

[75] Inventor: Christian Latge, Aix En Provence, France

[73] Assignee: Commissariat A L'Energie Atomique, Paris, France

[21] Appl. No.: 94,670

[22] Filed: Sep. 9, 1987

[30] Foreign Application Priority Data

Sep. 10, 1986 [FR] France ................... 86 12657

[51] Int. Cl.$^4$ .................. B01D 8/00; G21C 19/00
[52] U.S. Cl. ................... 210/184; 210/187; 210/335; 210/489; 210/521; 376/312
[58] Field of Search ............ 376/312; 210/175, 184, 210/187, 335, 321.6, 521, 532.1, 488, 489

[56] References Cited

U.S. PATENT DOCUMENTS

| | | | |
|---|---|---|---|
| 349,990 | 9/1886 | Gaillet et al. ................. | 210/521 |
| 492,421 | 2/1893 | McGowan ..................... | 210/521 |
| 618,965 | 2/1899 | Theurer ........................ | 210/488 |
| 837,845 | 4/1906 | Kiefer .......................... | 210/488 |
| 1,942,179 | 1/1934 | Magis et al. .................. | 210/187 |
| 2,474,705 | 6/1949 | Vaughan et al. .............. | 210/187 |
| 2,731,456 | 1/1956 | Weedman ...................... | 210/184 |
| 2,745,552 | 5/1956 | Bruggeman et al. . | |
| 2,815,277 | 12/1957 | Bruggeman et al. . | |
| 3,483,980 | 12/1969 | Cochran et al. . | |
| 3,831,912 | 8/1974 | Shimoyashiki et al. . | |
| 4,528,099 | 7/1985 | Rieger et al. ................. | 210/489 |
| 4,655,918 | 4/1987 | Eertink ......................... | 210/521 |
| 4,683,056 | 7/1987 | Humphries et al. ............ | 210/187 |
| 4,710,294 | 12/1987 | Ziller ............................ | 210/488 |

FOREIGN PATENT DOCUMENTS

| | | |
|---|---|---|
| 0109877 | 10/1983 | European Pat. Off. . |
| 0184488 | 11/1985 | European Pat. Off. . |
| 2412915 | 12/1978 | France . |
| 0044761 | 10/1981 | Japan .................... 376/312 |
| 429468 | 11/1974 | U.S.S.R. ................ 376/312 |
| 15990 | 10/1887 | United Kingdom ...... 210/521 |

OTHER PUBLICATIONS

Nuclear Technology, vol. 48, 5/80, pp. 196–203, "Impurity Deposition in a Mesh-Packed Cold Trap", Murase et al.

Nuclear Engineering, Jan. 1964, pp. 10–16, Phillips, vol. 9.

Primary Examiner—Harvey E. Behrend
Attorney, Agent, or Firm—Nutter, McClennen & Fish

[57] ABSTRACT

Cold trap for the purification of liquid metals containing dissolved impurities comprises several independently operating cooling modules, so as to bring about the crystallization of impurities, a liquid metal supply pipe, a purified liquid metal discharge pipe and a series of filter assemblies arranged in a staggared manner and on which the impurities crystallize. The cold trap is particularly suitable for the purification of the molten sodium used in nuclear power stations.

8 Claims, 2 Drawing Sheets

COLD TRAP FOR THE PURIFICATION OF LIQUID METALS CONTAINING DISSOLVED IMPURITIES

BACKGROUND OF THE INVENTION

The present invention relates to a cold trap for liquid metal, such as is found in the nuclear industry, as well as to processes for using this trap.

Fast neutron nuclear reactors use liquid sodium as the cooling fluid, both for the primary circuit and for the secondary circuits. The length of the operating cycles, as well as their number, explains why it gradually becomes charged with impurities, mainly sodium hydride and oxide. These pollutants can be continuously produced during the operation of the power station, e.g. by hydrogen diffusion through the steam generator walls to the secondary circuit, or by the activation of steel or by diffusion through the fuel cans of certain fission products, such as protons and tritium in the case of the primary circuit. The pollutants can also be discontinuous. Handling undergone by the assemblies during each cycle and also occasionally certain components, pollute the sodium by introducing adsorbed gases and metal oxides. Finally, steam generator leaks can lead to sodium-water reactions in the secondary circuit, with the production of sodium hydroxide and hydrogen, which can decompose into hydride and oxide.

This leads to the corrosion of the metal surfaces of the circuits by hydrogen and to the embrittlement thereof by the hydrogen, the pollution thereof by corrosion products carried by the sodium and activated in the core and deposited in the cold zones which are consequently contaminated. This can cause handling and maintenance problems, disturbance to the detection measurements of steam generator leaks in the secondary circuit through variations in the hydrogen concentration and finally to the crystallization of the sodium hydride and oxide at the cold points of the circuit, which can lead to the clogging of the narrowed sections or can damage the pumps.

It is to eliminate such pollutants that the sodium circuits are provided with cold traps, which essentially comprise a reservoir which is cooled in such a way that the impurities crystallize and are held back in said traps. To this end, it is possible to use a retention element constituted by metal wool through which the sodium is forced to pass. Thus, the outflow, which becomes turbulent, and the presence of a tight network of wires assists the crystal germination effect. The satisfactory operation of the reactor requires, on the one hand, the permanent use of a cold trap under so-called "maintenance purification" conditions, because the impurities created by the continuous pollution must be fixed with a speed equal to the pollution speed and, on the other hand, occasionally, to a more intense use of the trap, which is obtained by increasing the flow rate during a "purification campaign", in order to reduce the concentration of oxygen and hydrogen due to a discontinuous pollution. Several problems are caused by the presently known cold traps. Firstly the impurity retention element is liable to rapid dirtying and this can lead to the clogging thereof making it necessary to change said trap several times during the life of the power station.

In addition, the volume of the cold trap is not very well used, because the entry temperature into the trap is above the temperature at which crystals appear for the corresponding concentration of impurities. Thus, part of the trap length, located close to the intake remains unused. This unused trap length is greater under maintenance purification conditions than during the purification campaign. Thus, the prior art traps all operate with a constant longitudinal thermal gradient and the variation between the temperature at which the crystals appear and that of the cold point is smaller under maintenance conditions than during a purification campaign.

SUMMARY OF THE INVENTION

The present invention makes it possible to largely solve these problems by means of a cold trap having a simple construction and which can be used throughout the life of the power station.

This cold trap more specifically comprises a supply pipe for polluted liquid metal to be purified within a reservoir, a pipe for discharging the purified liquid metal from said reservoir and cooling means around said reservoir, wherein it comprises a plurality of perforated plates lined with metal wool, arranged perpendicularly to the overall outflow direction of the liquid metal to be purified, which are spaced from one another and having a recess displaced between individual plates so as to permit a staggered outflow of the liquid metal between all the plates.

This plate means is completed by a plurality of cooling modules operating independently and arranged around the reservoir.

DESCRIPTION OF THE DRAWINGS AND PREFERRED EMBODIMENTS

The constitution and operation of this trap will be better understood by referring to the following drawings given in an illustrative and non-limitative manner and which are longitudinal sectional views of two embodiments of the trap.

Advantageously, the trap alternatively compromises first filler assemblies having a peripheral opening defined the first filler assembly and by the reservoir and second filler assemblies each having a central opening. In this case, according to an advantageous embodiment, the purified metal discharge pipe is located in the reservoir, the purified metal passing through the discharge pipe in the direction opposite to that of the metal to be purified and the discharge pipe passes into the openings of the second filter assemblies and supports the first filter assemblies.

In the embodiment of the invention shown in FIG. 1, the trap has a symmetry of revolution, which is conventional, but not necessary for the realization of the invention.

This trap comprises a reservoir 1 limited by a lateral ferrule 8 and by two bases 9', 9" supplied with liquid sodium by means of a supply pipe 2 and said sodium is then discharged by a discharge pipe 4, which is here in counter current from bottom to top, using an axial chute in the center of the reservoir and which constitutes an economizer.

Supply pipe 2 ensures a uniform supply to reservoir 1 by means of openings 3 arranged regularly around the circumference of said pipe, close to a sealed end 5 thereof and issuing into the top of reservoir 1.

Within the reservoir 1 are arranged several filter assemblies 6, 7 for retaining liquid sodium impurities and which are of two types. The first 6 are fixed to the axial discharge chute 4 and have a smaller diameter than that of the lateral ferrule 8. The others 7, which alternate with filter assemblies 6 are fixed to ferrule 8 and are provided in the center thereof with a recess which has a larger diameter than the discharge means 4.

However, these filter assemblies 6 and 7 have important common points. They are perforated, i.e. constituted by a liquid metal-permeable base 12, such as a latticed frame, which is covered by one or more layers of metal wool, e.g. two layers, namely an upper layer 10 and a lower layer 11, the latter having a density which is possibly twice that of the former.

The metal wool is maintained in place by a cylindrical rim 13 fixed to base 12 and having a height exceeding the total height of the two layers 10 and 11. Rim 13 surrounds the outer edge of plates 6. Plates 7 are surrounded on their inner edge by the rim 14.

The cooling means is constituted by several independently functioning modules, which are arranged in series on the periphery of the reservoir and there are three of them in this case, having an identical construction. It is possible to use the configuration of a coil 20 traversed by an organic fluid immersed in another fluid 21, which serves as a thermal joint within an envelope 22, in which fluid 21 stagnates. It can also be a cooling system operating with air.

The cooling fluid is determined by the construction of the installation. In this case air can advantageously be used. The stagnant fluid 21 is generally the eutectic NaK, which does not have harmful consequences in the case of the wall of reservoir 1 breaking and eutectic mixing with the molten sodium. Finally, a valve 26 is installed at the bottom of reservoir 1 in order to bring about the emptying thereof.

Figure 2:
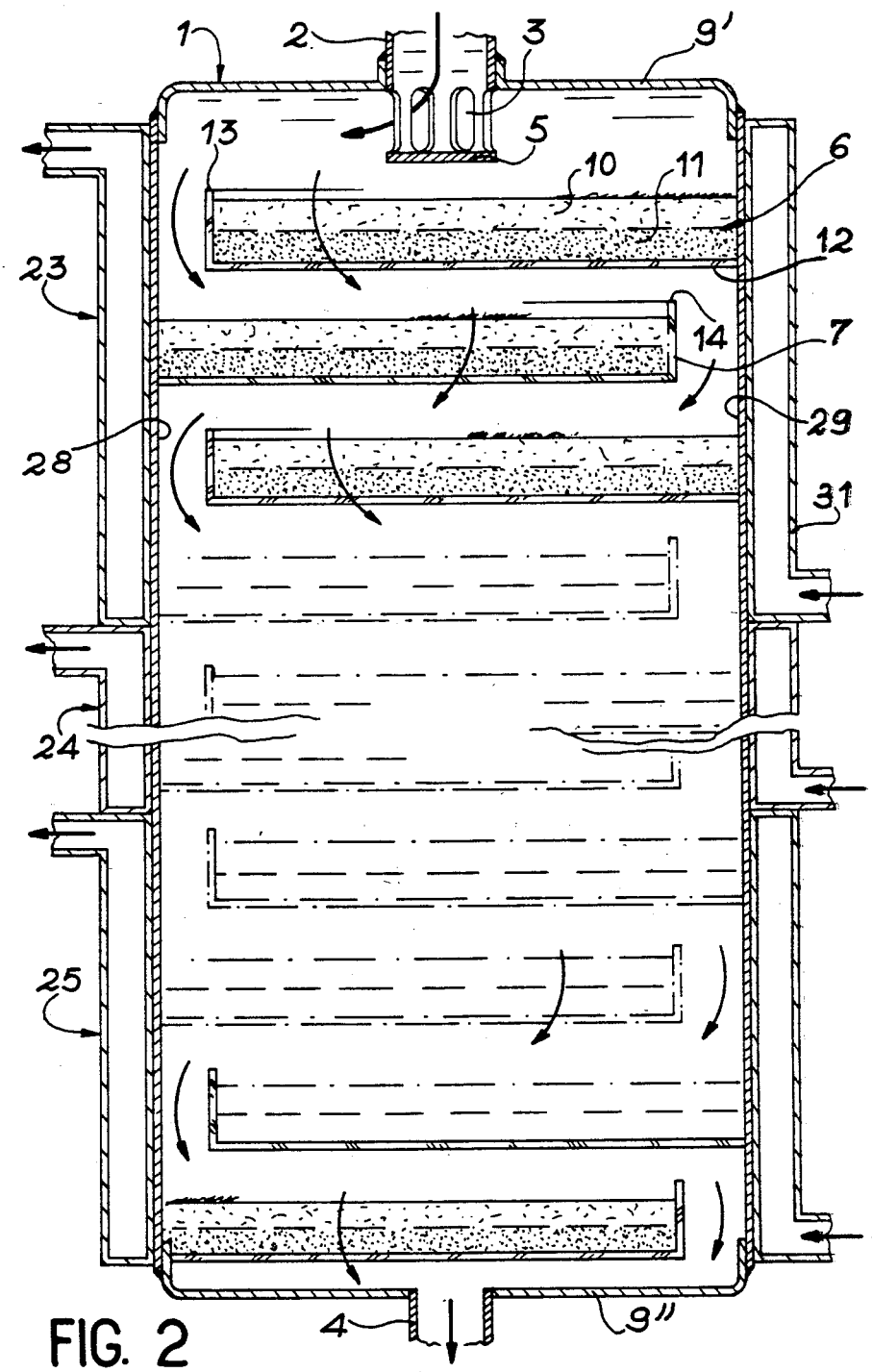

According to a second embodiment shown in FIG. 2, the trap admits a plane of symmetry in the overall outflow direction and the section of the reservoir normal to the sectional plane is rectangular. Filter assemblies 6, 7 are alternately fixed to one and the other of the two opposite walls 28, 29 of the reservoir. The cooling fluid is e.g. air, which for each cooling module 23, 24, 25, circulates between reservoir 1 and a calender 31. The purified sodium is discharged directly from the trap by discharge pipe 4. However, the operation and advantages of said second embodiment of the invention are the same and the remainder of the description can apply to either of the drawings. Moreover, the cooling systems shown in FIGS. 1 and 2 are equivalent and can be interchanged.

The apparatus according to the invention constitutes a favorable compromise between sometimes contradictory requirements. Thus, numerous parameters influence the qualities of a cold trap. The arrangements adopted are justified by the operating conditions explained hereinbefore.

It is firstly pointed out that the equation governing the cold trap is:

$$V = E \times (Ce - C) \times D \text{ in which } E = (Ce - Cs)/(Ce - C)$$

V being the purification rate, in which, in fact, represents the mass flow of impurities fixed by the trap, D is the mass flow of liquid metal circulating in the trap, Ce and Cs are liquid metal impurity concentrations at the inlet and outlet of the trap and C is the solubility of the impurities at the temperature of the cold point of the trap. As D is dependent on requirements which are foreign to the cold trap, the term on which it is possible to act is the efficiency E, which is the ratio between the real purification and the maximum purification.

An example will be given where the three cooling modules 23, 24, 25 is each able to lower the temperature of the molten sodium by 8° C. In the case of a purification campaign, by a careful choice of the flow rate, it is possible to fix the temperature of the cold point of the trap to 20° C. below that at which crystals appear. If all three cooling modules 23, 24, 25 are put into operation, so as to ensure a total cooling of 24° C., a cooling of 4° C. of the sodium entering the trap is sufficient to bring about the start of the crystallization of the impurities.

Thus, as shown in FIG. 1 the crystallization of the impurities starts close to the mid-height line L23 of module 23. Part is fixed to the filter assemblies 6 and 7, which are traversed by the liquid sodium in accordance with the arrows carried in the left-hand part of FIG. 1. The alternation of assemblies 6 and 7 guarantees that each fluid stream will pass through at least some of these. Moreover, the layers of metal wool 10 and 11 create a turbulent outflow, which improves the retention capacity thereof, because the impurities more easily come into contact with the already formed crystals, which favors the growth of the latter.

The thus purified liquid continues to fall, its temperature progressively decreasing and new impurities crystallize and are collected by the following filter assemblies 6 and 7. As this decrease is regular, the saturation and crystallization concentrations vary roughly regularly over small temperature ranges and the filter assemblies 6 and 7 have an identical structure, it can be concluded that the dirtying thereof is roughly uniform. This characteristic is very important because local clogging effects in the narrowed, cold parts are one of the causes limiting the life of cold traps.

The extended operation of the installation leads to the accumulation of crystallized pollution products. Several phenomena then appear, which then have apparently opposing influences on the efficiency thereof.

A solid crust 30 forms over most of the surface of the metal wool layer 10 and to a lesser extent on the bottom 12 of filter assemblies 6 and 7. It is maintained by the rims 13, 14, which also retain by decanting certain products of a possible sodium-water reaction. It also forces an increasingly large part of the liquid sodium to pass around filter assemblies 6 and 7. When this crust forms an impermeable barrier, the sodium circulates in accordance with the arrows appearing on the right-hand part of the drawing (it being assumed that the closest filter assembly 6 to the supply pipe 2 is located in an area where the impurities do not crystallize).

Thus, most of the liquid metal is spaced from the solid surfaces, which are the seat of the crystallization and that the surface of the reservoir facing the filter assemblies 7 is no longer in contact with the sodium, which is liable to reduce the efficiency of the cooling operation. However, purification continues to be ensured by diffusion towards the lower and upper surfaces of the plates, which are covered with crystals. Moreover, the sharp edge of the rims 13, 14, the irregular surface of layer 30 and the greatly extended path imposed on the fluid streams maintain the turbulence of the flow, which favor the aforementioned phenomena. The efficiency of such a cold trap remains roughly constant over a period of time and is close to unity.

Under maintenance purification conditions, it is possible to use the cooling modules 23, 24, 25 separately. During a given period following the putting into operation of the new trap, it is firstly possible to bring about the operation of the lower modules so as to seed the bottom of the trap. It is then possible to bring about the operation of the upper modules while putting the lower modules out of operation. Thus, an important area of the trap remains isothermal and seeded, which makes it possible to achieve an efficiency close to 1.

The preliminary stage consists of putting into operation a number of contiguous cooling modules close to the intake of the discharge pipe 4 and sufficient for bringing about the crystallization of the impurities. The putting into operation of the modules 24 and 25, using the example referred to hereinbefore, also brings about a temperature drop of 16° C. On adjusting the flow rate in such a way that the sodium saturation temperature corresponding to its concentration in impurities exceeds by 12° C. that of the cold point, a crystallization occurs on the surfaces below line L24 at mid-height of module 24. Filter assemblies 6 and 7 located below L24 are consequently seeded with crystals and said operation is continued until said seeding is considered to be adequate and covers the metal wires of layer 10 and 11 with a thin and roughly continuous film.

The second stage then consists of putting into service an adequate number of contiguous cooling modules close to the supply pipe 2 in order to bring about the crystallization of impurities on filter assemblies 6 and 7 located below these modules. The putting into service of modules 23, 24 and the stopping of module 25 maintain the overall cooling of 16° C., but it now the line L23 at mid-height of module 23 which marks the start of the appearance of crystallized impurities. The area facing module 25 becomes isothermal and the previously effected seeding favors the growth of impurity crystals on filter assemblies 6 and 7, which therefore continue to be useful. During this second stage, the efficiency is equal to unity, to the extent that a seeded isothermal zone is created at the cold point temperature. A roughly regular dirtying of the filter assemblies 6 and 7 can be expected, with the exception of those located above line L23 and only representing one sixth of the installation. On comparable installations having no modular cooling, said dead volume is equal to half or even more of the total volume.

This installation consequently makes it possible to solve in a simple and economic manner the problem of giving liquid sodium circuits large capacity cold traps provided for the life of the power station and whose efficiency is roughly constant throughout this time and which lend themselves to varied utilizations, as a function of whether operation is under maintenance purification or purification campaign conditions.

The presence of previously seeded plates in isothermal zones leads to an increase in the efficiency of the installation. Finally, the staggered arrangement of filter assemblies 6 and 7, apart from contributing to reducing efficiency variations during the dirtying thereof, makes it possible to prevent any premature clogging of the cold trap, which would significantly reduce the life of the preceding devices and would in particular lead to a considerable uncertainty in this connection. Thus, in this case there is no need to overdimension the trap.

What is claimed is:

1. A liquid metal purification cold trap comprising a reservoir pipe for supplying the liquid metal to be purified and linked with the intake of the reservoir, a pipe for discharging the purified metal linked with the outlet of the reservoir, a plurality of independently operating cooling means around said reservoir, and in series along the reservoir and, in the reservoir, a plurality of filter assemblies having perforated bases lined with metal wool, the filter assemblies being arranged perpendicular to the overall direction of the outflow of the liquid metal to be purified, being spaced from one another and each defining an opening, the openings being staggered so so as to permit a staggered outflow of the liquid metal in the reservoir.

2. A cold trap according to claim 1, wherein each filter assembly comprises a liquid metal-permeable rigid base, two metal wool layers, the layer in contact with the base being the denser and a rim around the opening in that filter assembly and which is higher than the total thickness of two metal wool layers of that assembly.

3. A cold trap according to claim 1, wherein the filter assemblies alternatively comprise first filter assemblies defining a peripheral opening surrounding the first filter assemblies and surrounding by the reservoir and second filter assemblies defining a central opening.

4. A cold trap according to claim 3, wherein the purified metal discharge pipe is located in the reservoir, the purified metal passing through the discharge pipe in the opposite direction to that of the metal to be purified and wherein the discharge pipe passes into the openings of the second filter assemblies and supports the first filter assemblies.

5. A cold trap according to claim 1, wherein the filter assemblies alternatively comprise first plates each having an opening close to a first wall of the reservoir and second plates each having an opening close to a second wall of the reservoir opposite of the first wall.

6. A cold trap according to claim 1, wherein the cooling means in each case have a coil traversed by an organic fluid and immersed in a stagnant liquid.

7. A cold trap according to claim 1, wherein the cooling means in each case have a wall enveloping the reservoir and traversed by an air current.

8. A cold trap according to claim 1, wherein there are three cooling means.

* * * * *